United States Patent
Mochizuki et al.

(10) Patent No.: US 7,606,006 B2
(45) Date of Patent: Oct. 20, 2009

(54) MAGNETIC RECORDING HEAD AND MAGNETIC DISK STORAGE APPARATUS MOUNTING THE MAGNETIC HEAD

(75) Inventors: Masafumi Mochizuki, Tokyo (JP); Kaori Suzuki, Tokyo (JP); Kimitoshi Etoh, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 391 days.

(21) Appl. No.: 11/014,025

(22) Filed: Dec. 15, 2004

(65) Prior Publication Data

US 2005/0141142 A1 Jun. 30, 2005

(30) Foreign Application Priority Data

Dec. 24, 2003 (JP) ............................. 2003-427681

(51) Int. Cl.
*G11B 5/33* (2006.01)
*G11B 5/127* (2006.01)

(52) U.S. Cl. .................................. 360/319; 360/125.03

(58) Field of Classification Search ................. 360/319, 360/317, 324, 320, 125.03
See application file for complete search history.

(56) References Cited

U.S. PATENT DOCUMENTS

| | | | | |
|---|---|---|---|---|
| 3,975,772 A | * | 8/1976 | Lin | 360/317 |
| 5,555,147 A | * | 9/1996 | Maruyama | 360/317 |
| 6,156,375 A | * | 12/2000 | Hu et al. | 427/116 |
| 7,212,382 B2 | * | 5/2007 | Otomo | 360/317 |
| 2003/0081359 A1 | * | 5/2003 | Pust et al. | 360/319 |
| 2003/0231435 A1 | * | 12/2003 | Kong et al. | 360/317 |
| 2004/0240121 A1 | * | 12/2004 | Etoh et al. | 360/317 |
| 2004/0246630 A1 | * | 12/2004 | Otomo | 360/317 |
| 2005/0073774 A1 | * | 4/2005 | Wang et al. | 360/126 |
| 2006/0092575 A1 | * | 5/2006 | Mochizuki et al. | 360/317 |

FOREIGN PATENT DOCUMENTS

| | | |
|---|---|---|
| JP | 2000-048327 | 2/2000 |
| JP | 2001-176031 A | 6/2001 |
| JP | 2001-236614 | 8/2001 |
| JP | 2002-100006 | 4/2002 |
| JP | 2003-157511 | 5/2003 |

* cited by examiner

*Primary Examiner*—Andrea L Wellington
*Assistant Examiner*—Adam B Dravininkas
(74) *Attorney, Agent, or Firm*—Townsend and Townsend and Crew LLP; Rambod Nader (57) ABSTRACT

Embodiments of the invention provide a write head for perpendicular recording in which the magnetic field intensity applied at a read element is reduced with larger write-field gradients and the distance between a write element and a read element is small. In one embodiment, a pair of magnetic bodies for shielding a read element are provided on the leading and trailing sides of the read element respectively and whichever one of the two shields is the longer in the length from the air bearing surface is shorter than the length up to the back contact position $P_{BK}$ at which a main pole and an auxiliary pole are connected.

9 Claims, 10 Drawing Sheets

Prior Art

Fig. 15

Prior Art

Fig.16

MAGNETIC RECORDING HEAD AND MAGNETIC DISK STORAGE APPARATUS MOUNTING THE MAGNETIC HEAD

CROSS-REFERENCES TO RELATED APPLICATIONS

This application claims priority from Japanese Patent Application No. JP 2003-427681, filed Dec. 24, 2003, the entire disclosure of which is incorporated herein by reference.

BACKGROUND OF THE INVENTION

The present invention relates to a perpendicular recording magnetic head and a magnetic disk storage apparatus which incorporates the same.

In a magnetic disk apparatus, data on a recording medium is read or written by a magnetic head. In order to increase the capacity of the magnetic disk storage, the areal density has to be increased. However, in the conventional longitudinal recording method, the thermal fluctuation in medium magnetization prevents one from achieving the higher areal density. A solution to this problem is to employ a perpendicular recording method whereby the recorded magnetizations are aligned in the direction perpendicular to the medium.

The perpendicular recording method is available in two types: one type uses a double-layered perpendicular medium having a soft underlayer (SUL) and the other type uses a single-layered perpendicular medium having no soft underlayer. When a double-layered perpendicular medium is used as a recording medium, it is necessary to use a single-pole type head which has a main pole and an auxiliary pole for recording. In this case, higher field intensity can be applied to the medium.

BRIEF SUMMARY OF THE INVENTION

Figure 14:
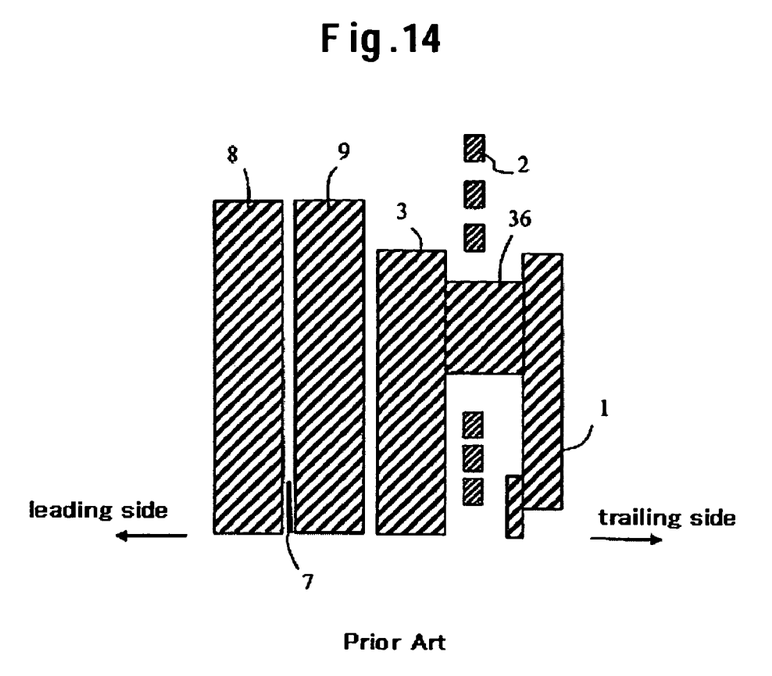
FIG. 14 shows the structure of a conventional magnetic head.
Figure 15:
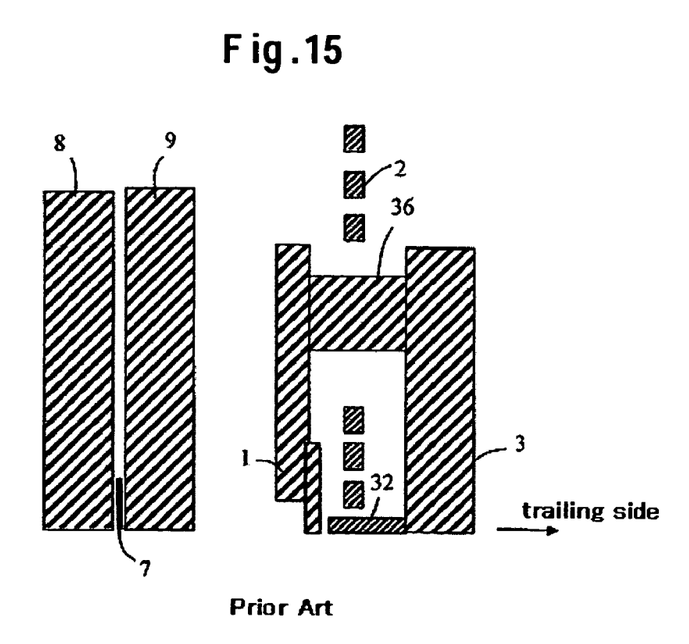
FIG. 15 shows the structure of a conventional magnetic head.

The present invention relates to a perpendicular recording system which uses a perpendicular recording write head with a main pole and an auxiliary pole and a double-layered perpendicular recording medium with a magnetic recording layer and a soft underlayer. As shown in FIG. 14, a conventional perpendicular recording write head consists of a lower shield 8, a read element 7, an upper shield 9, an auxiliary pole 3, a thin film coil 2, and a main pole 1 which are laminated in the head travel direction (from the leading side) in the order of mention. This structure has a drawback: since the auxiliary pole and the thin film coil are located between the read element and the main pole, the write-read element distance is larger, which causes a degradation of the format efficiency. A structure which has been proposed to avoid this problem is that in which the auxiliary pole 3 is located on the trailing side of the main pole 1 as shown in FIG. 15. This structure can decrease the write-read element distance.

Not only the write field intensity of the write head but also write-field gradients which determine the magnetization transitions, are important factors for achieving a high recording density. In order to achieve a higher recording density, the write-field gradients must be increased. In order to increase the write-field gradients, there is a structure in which a magnetic body 32 is located as a shield on the trailing side of the main pole. Even in this structure, it is desirable that the auxiliary pole be located on the trailing side in order to make a closed magnetic path, as shown in FIG. 15.

However, in the structure shown in FIG. 15, the field intensity applied at the read element is higher than that in the conventional structure shown in FIG. 14. According to the three-dimensional magnetic field calculation made by the inventors, the field intensity in the conventional structure shown in FIG. 14 is $1.18 \times 10^4$ A/m while that for the structure shown in FIG. 15 is $5.89 \times 10^4$ A/m. This increase in field intensity might cause an instability in reader characteristics or damage to the read element, making it difficult to achieve a high recording density in a magnetic disk apparatus.

The present invention has been made in view of the above circumstances and provides a head structure which assures an improved format efficiency without an increase in the field intensity applied at the read element and also provides a magnetic disk apparatus which thereby achieves a high recording density.

According to an aspect of the present invention, a magnetic head comprises a write head having a main pole and an auxiliary pole; and a read head having a pair of reader shields and a read element located between the pair of reader shields, wherein the length of the reader shields from an air bearing surface in the direction of the element height is shorter than the length of the main pole from the air bearing surface to a position of back contact (position farthest from the air bearing surface in the area of connection of the main pole and auxiliary pole), or shorter than the length of the main pole. It is desirable that the main pole be located nearer to the pair of reader shields than the auxiliary pole. This reduces the field intensity applied at the read element. However, in order for the reader shields to perform their function, the length of the reader shields from the air bearing surface in the direction of the element height should be at least twice the length of the read element from the air bearing surface.

The inventors of the present invention made a three-dimensional field intensity calculation by computer simulation and have found that when one of the two reader shields which is longer in the length from the air bearing surface is shorter than the length of the auxiliary pole from the air bearing surface to the position of back contact, the field intensity applied at the read element is reduced. The use of such a perpendicular recording head makes it possible to decrease the distance between the write element and the read element and improve the format efficiency, thereby realizing a magnetic disk apparatus with a higher recording density. A technique that the length of reader shields is decreased is disclosed in JP-A No. 176031/2001. In this technique, the length of one read shield of two was smaller than the distance from the air bearing surface to the position of back contact for conventional longitudinal media. However, when a double-layered perpendicular medium with a soft underlayer is employed, the technique cannot achieve such advantageous effects as the present invention offers, because there is a magnetic flux passing through the soft underlayer.

Similar advantageous effects can also be achieved by the use of reader shields with a relative permeability of 100 or less, in place of the use of reader shields whose length in the direction of the element height is short. Another possible approach is as follows. A pair of reader shields, with a read element between them, each consists of a layer of a first material and a layer of a second material which are connected in the direction of the element height and different in permeability. Here, the permeability of the first material layer, nearer to the air bearing surface, is higher than the permeability of the second material layer, farther from the air bearing surface, and the length of the first material layer from the air bearing surface in the direction of the element height is shorter than the length of the main pole, more preferably the length of the main pole from the air bearing surface to the position of back contact.

Accordingly, embodiments of the present invention provide a perpendicular recording head which reduces the field intensity applied at the read element and improves the format efficiency without deterioration in the read element or damage to it and also provide a magnetic disk storage apparatus which incorporates the head and achieves a high recording density.

DETAILED DESCRIPTION OF THE INVENTION

Next, exemplary embodiments of the present invention will be described referring to the accompanying drawings.

Figure 1:
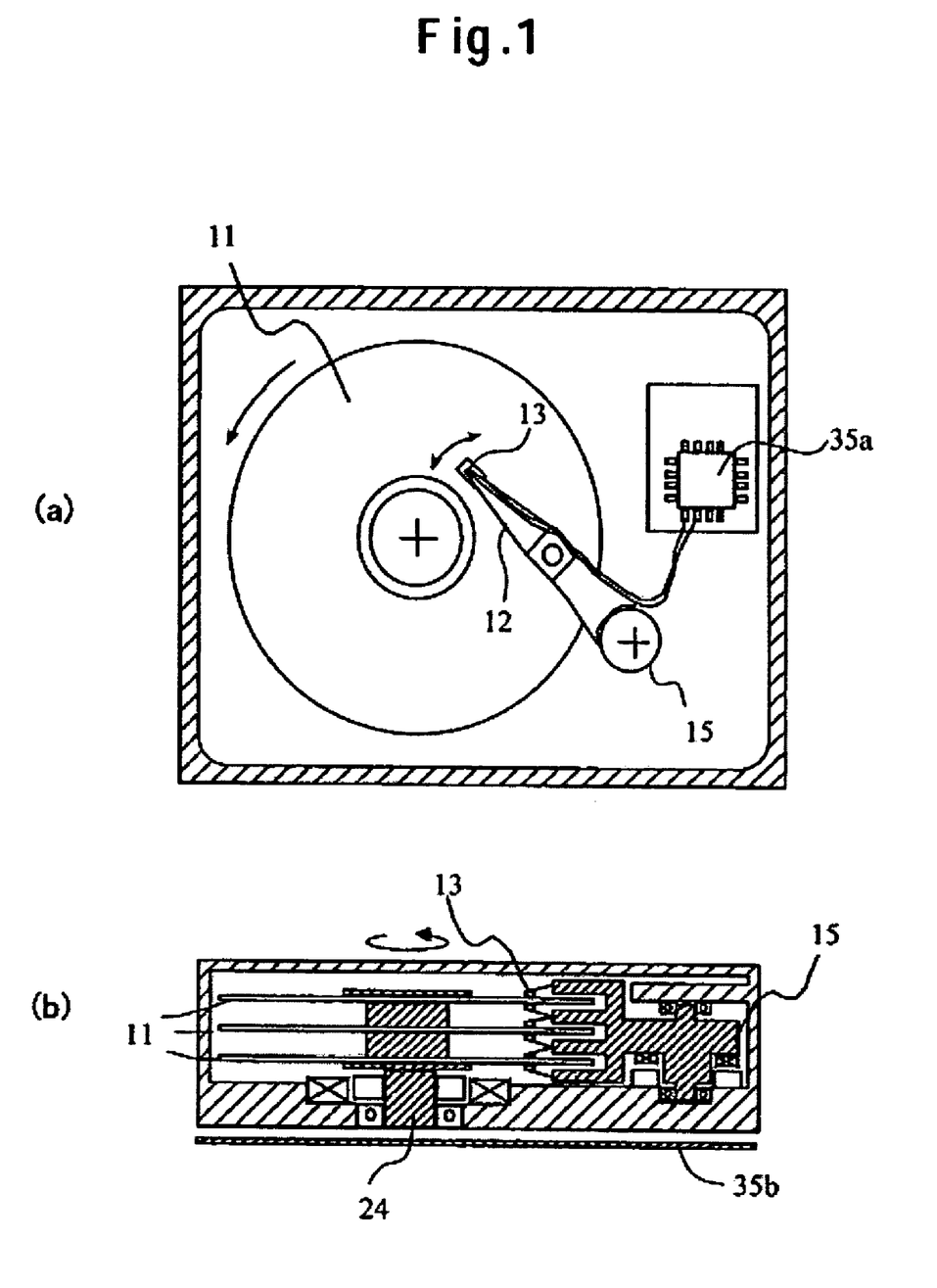
FIG. 1 is a schematic diagram showing a magnetic disk apparatus according to an embodiment of the present invention.

FIG. 1 is a conceptual diagram showing a magnetic disk apparatus according to an embodiment of the present invention. In this magnetic disk apparatus, a magnetic head mounted on a slider 13 fixed to the tip of a suspension arm 12 writes and reads magnetization signals at a given position on a magnetic disk 11 which is rotated by a motor 24. A rotary actuator 15 is driven to select a magnetic head position (track) in the magnetic disk radial direction. A write signal to the magnetic head and a read signal from the magnetic head are processed by signal processing circuits 35a and 35b.

Figure 2:
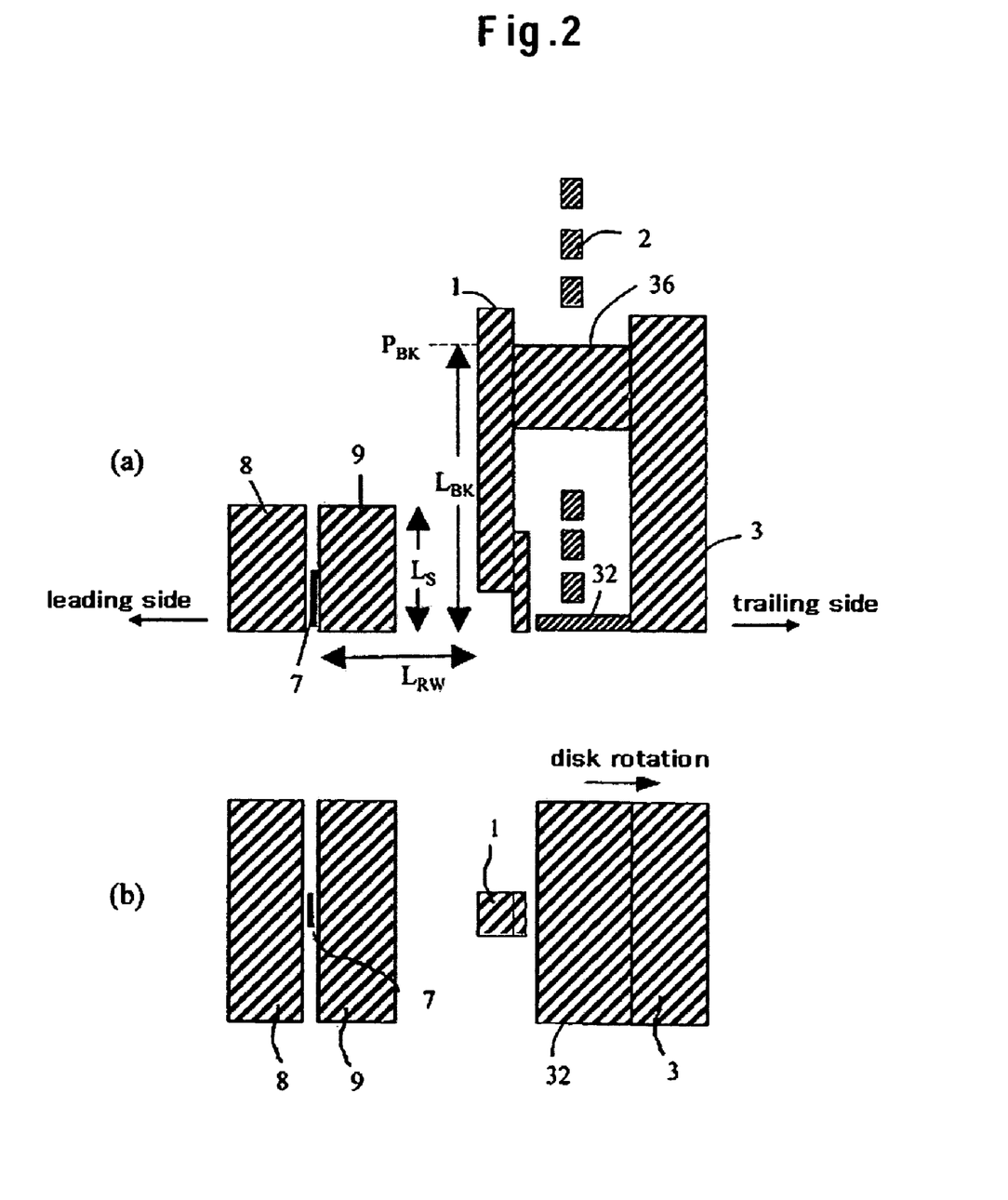
FIG. 2 shows the structure of a magnetic head according to an embodiment of the present invention.

FIG. 2 schematically shows a perpendicular recording head according to an embodiment of the present invention, where FIG. 2(a) is a cross-section view and FIG. 2(b) a plan view from the air bearing surface (ABS). This magnetic head is a write/read combination head which has a write head with a main pole 1 and an auxiliary pole 3 and a read head with a read element 7. The main pole 1 and the auxiliary pole 3 are magnetically connected in a position away from the air bearing surface through a pillar 36 and a thin film coil 2 is interlinked with a magnetic circuit which is composed of the main pole 1, auxiliary pole 3 and pillar 36. The read element 7, which is a giant magneto resistive element (GMR) or a tunneling magneto resistive element (TMR), is located between a pair of magnetic shields (reader shields) which comprise a lower shield 8 at a leading side and an upper shield 9 at a trailing side. The main pole 1 is located on the leading side of the auxiliary pole 3. A magnetic body 32 for increasing field gradients is located on the trailing side of the main pole 1.

Figure 3:
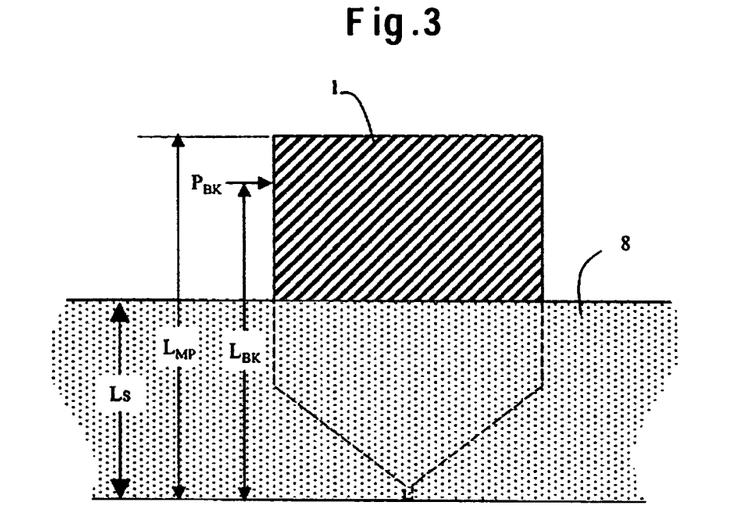
FIG. 3 is a plan view showing a head according to an embodiment of the present invention as viewed from the reader shield side.

As mentioned earlier, when the main pole 1 is located on the leading side of the auxiliary pole 3, the field intensity applied at the read element 7 is increased. Therefore, according to the present embodiment, $L_S$, or the length from the air bearing surface of whichever one of the lower shield 8 and the upper shield 9 is the longer in that length, is shorter than the length of the main pole 1, $L_{MP}$, where these shields are magnetic bodies which magnetically shield the read element 7. More preferably, the length of the upper shield 9 and the lower shield 8 should be shorter than the distance from the air bearing surface to the area of connection of the main pole 1 and the auxiliary pole 3. In other words, the length of the upper shield 9 and the lower shield 8 should be shorter than $L_{BK}$, the length from the air bearing surface to the back contact position $P_{BK}$ of the main pole 1. In this specification, as illustrated in FIG. 2, a position farthest from the air bearing surface in the area of connection of the main pole and the auxiliary pole is referred to as the position of back contact $P_{BK}$. FIG. 3 is a plan view showing the head according to the present embodiment as viewed from the read element shield side. As illustrated here, the length $L_S$ of the lower shield 8 or the upper shield 9 is shorter than the length $L_{MP}$ of the main pole 1 of the write head and, in this case, shorter than the length $L_{BK}$ from the air bearing surface to the position of back contact $P_{BK}$ of the main pole 1.

Figure 4:
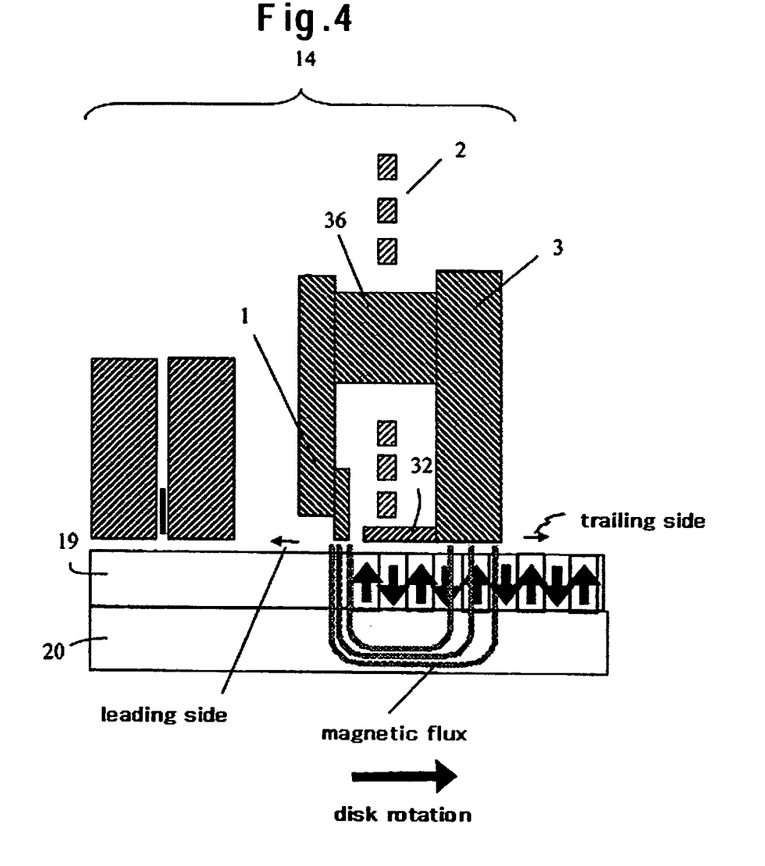
FIG. 4 is a schematic diagram illustrating how perpendicular recording is done.

FIG. 4 shows the relation between the perpendicular recording head 14 and the magnetic disk 11 and outlines how perpendicular recording is done. A magnetic field from the main pole 1 passes through a recording layer 19 and a soft underlayer 20 of the magnetic disk medium 11 and enters the auxiliary pole 3 to make up a magnetic circuit so that a magnetization pattern is recorded on the recording layer 19. There may be an intermediate layer between the recording layer 19 and the soft underlayer 20.

Figure 5:
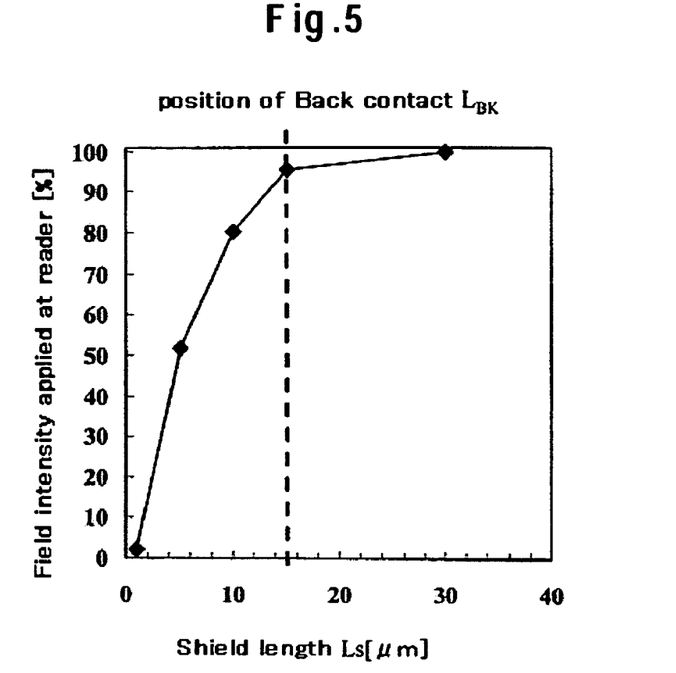
FIG. 5 shows the relation between the field intensity applied at the read element and the reader shield length $L_S$ from the air bearing surface.

FIG. 5 shows the relation between the field intensity applied at the read element and shield length $L_S$ of the length of a read shield from the air bearing surface in the magnetic head as shown in FIG. 2 where the write head main pole 1 is located on the read head side. This three-dimensional field intensity calculation assumes that the saturation flux density of the main pole is 2.4 T, the geometric width 120 nm, the thickness 150 nm. Also it is assumed that the saturation flux density of the backside of the tip of the main pole is 1.0 T, the film thickness is 2 μm, and length $L_{BK}$, the length from the air bearing surface to the position of back contact, is 15 μm. It is also assumed that the auxiliary pole 3 and the reader shields are made of a material with a saturation flux density of 1.0 T and the thickness of the reader shields 8 and 9 is 1.3 μm. The distance between the main pole and the read element is 4.3 μm. The field intensity applied at the read element is normalized to the field intensity under the condition that the length of read shield $L_S$ is 30 μm.

As can be understood from FIG. 5, when the length $L_S$ of the reader shields 8 and 9 from the air bearing surface is shorter than the length $L_{BK}$ from the air bearing surface to the back contact position $P_{BK}$ of the main pole, the field intensity applied at the read element sharply declines. A magnetic flux is saturated as the volume decreases from the pillar 36 connecting the auxiliary pole and main pole to the main pole. Therefore, there is more leakage magnetic flux in the vicinity of the position of back contact. Hence, when the length of the reader shields in the read element height direction is long, a larger amount of leakage magnetic flux goes to the shields and further goes to the soft underlayer. On the other hand, when the length of the reader shields in the read element height direction is short, the amount of inflow of leakage magnetic flux in the vicinity of the position of back contact decreases and thus the field intensity applied at the read element decreases. The effect of variation in aspect ratio may result in a larger demagnetizing field. When $L_S$ (reader shield length) is one third of the length $L_{BK}$ to the position of back contact, it is possible to reduce the field intensity applied at the read element to one half or less of that in the conventional structure. This can be achieved only when both the upper and lower shields are short. The inventors have found that even if only one of the shields is short, reduction in the field intensity applied at the read element is very small.

When the write head main pole is located on the read head side and brought nearer to the read head in order to improve the format efficiency, a measure to reduce the field intensity applied at the read element must be taken. As indicated in FIG. 5, for reduction in the field intensity applied at the read element, it is effective that the height of the reader shields from the air bearing surface is below the position of back contact of the main pole.

Figure 16:
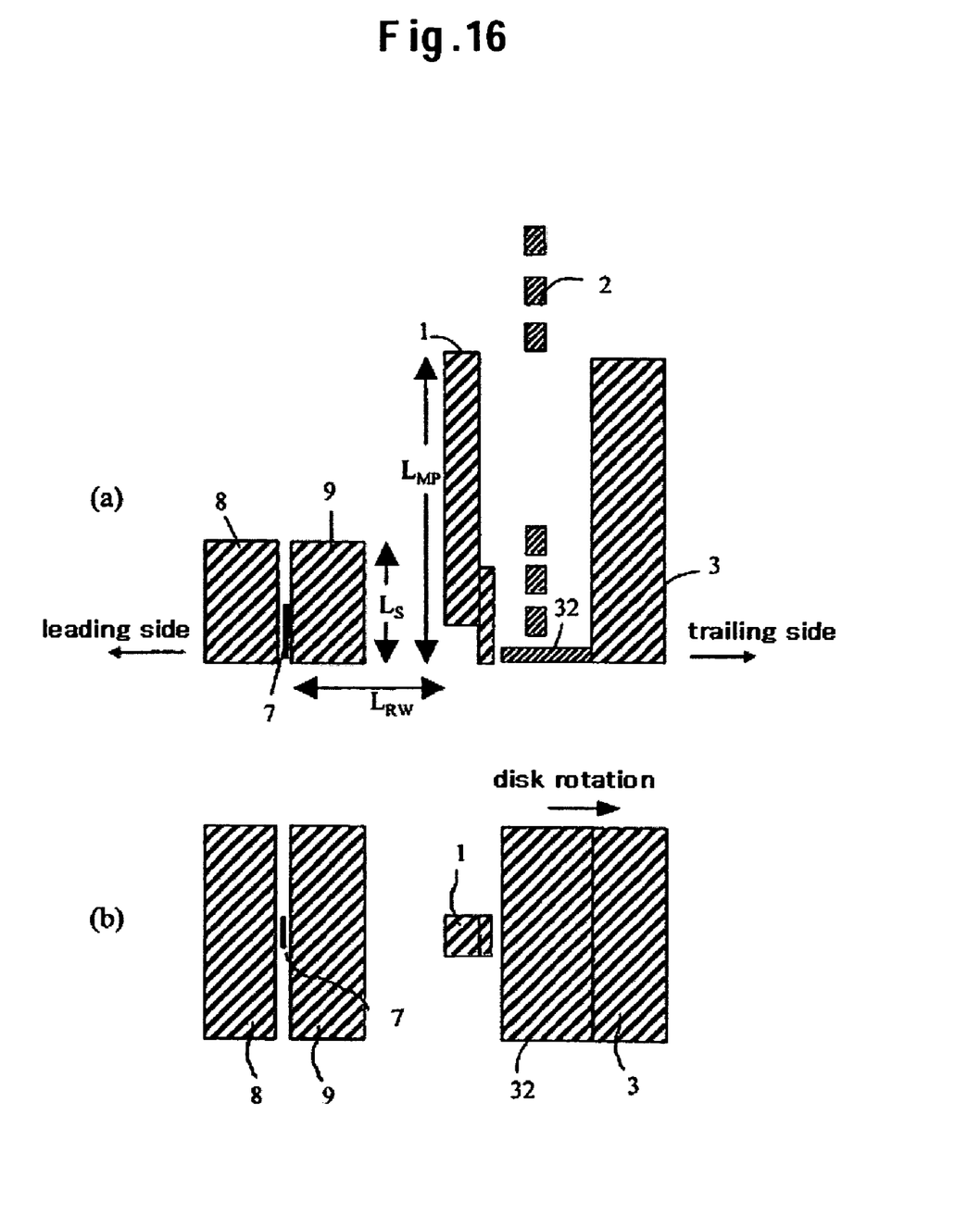
FIG. 16 shows the structure of a magnetic head according to another embodiment of the present invention.

Even in a structure which has no pillar 36 as shown in FIG. 16, magnetic flux leakage from the end of the main pole occurs while magnetic flux flows from the auxiliary pole to the main pole. In order to reduce the amount of inflow of this leakage magnetic flux from the end of the main pole into the reader shields, the length $L_S$ of the reader shields in the read element height direction should be shorter than the length $L_{MP}$ of the main pole in the read element height direction.

Considering that the primary function of the reader shields is to shield the read element, it is desirable that $L_S$, the length of the reader shields in the direction of the element height, is at least twice the length of the read element from the air bearing surface, namely the height of the read element.

Figure 6:
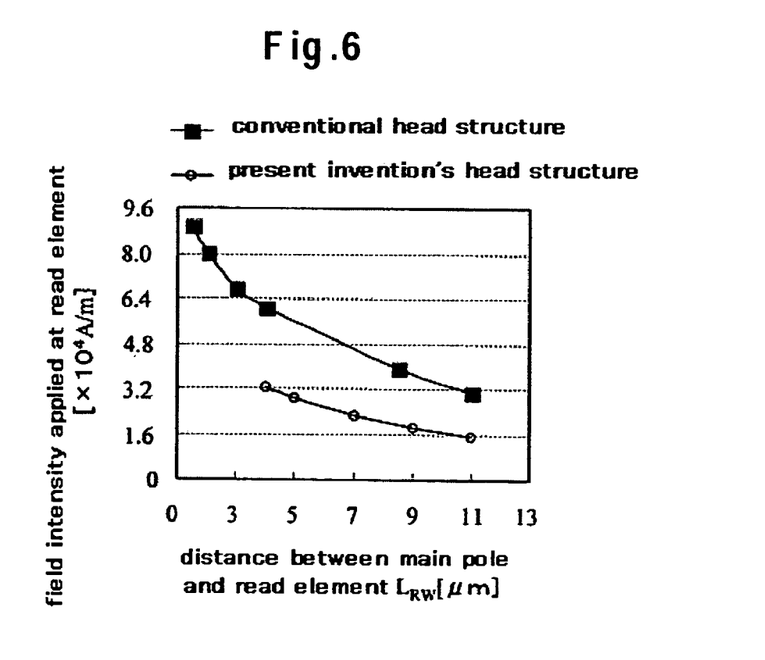
FIG. 6 shows the relation between the field intensity applied at the read element and the distance $L_{RW}$ between the read element and the write element (main pole).

FIG. 6 is a graph showing the field intensity which is applied at the read element as the distance $L_{RW}$ between the read element and the write element (main pole) is varied (see FIG. 2). The graph compares data for the present embodiment with data for the conventional structure. Here, the conventional structure refers to a head structure in which the reader shields are longer than the main pole length up to the position of back contact as shown in FIG. 15. The three-dimensional field intensity calculation made for the conventional structure is based on the assumption that the length of the reader shields, $L_S$, is 30 μm. The present invention's structure in FIG. 6 refers to the structure shown in the specific embodiment of FIG. 2 in which the length of the reader shields, $L_S$, is 5 μm, namely the shields are shorter than the main pole length up to the position of back contact. In both the conventional structure and the present invention's structure according to one specific embodiment, the reader shield thickness is 1.3 μm. The other conditions are the same as in the calculation which was made to plot the graph of FIG. 5. As apparent from FIG. 6, at any point of $L_{RW}$, the field intensity applied at the read element in the present invention's structure is a half or less of that in the conventional structure.

The inventors fabricated heads and conducted an experiment on them. The findings from the experiment are as follows. In a conventional head, when $L_{RW}$ is 11 μm, there is no change (deterioration) in the read element performance; however, when $L_{RW}$ is 4 μm, the reading performance seriously deteriorates and the read element is ineffective. On the other hand, in the present invention's structure according to the embodiment of FIG. 2, even when $L_{RW}$ is 4 μm, the field intensity applied at the read element is equal to that in the conventional structure in which $L_{RW}$ is 11 μm. This means that in the present invention's structure, no deterioration occurs in the read element performance even though $L_{RW}$ is small. When $L_{RW}$ is 4 μm, the write field intensity in the conventional structure is $9.2 \times 10^5$ [A/m] while that in the present invention's structure is $1.0 \times 10^6$ [A/m]. Therefore, the present invention's structure is more suitable for higher density recording.

Figure 7:
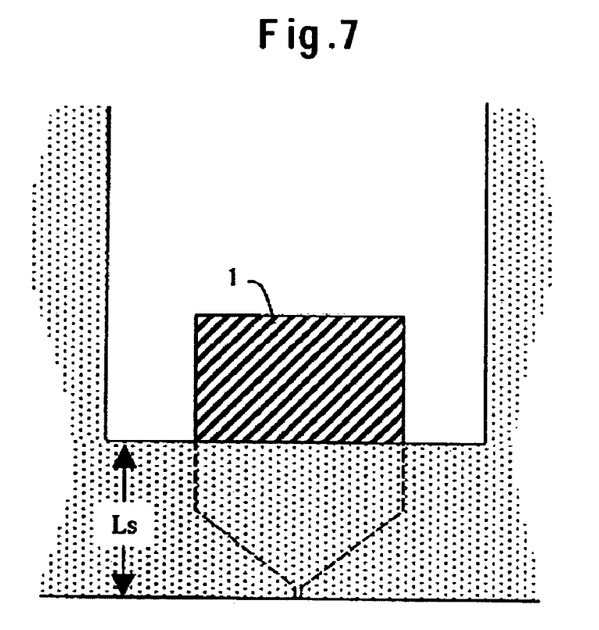
FIG. 7 is a plan view showing another embodiment of the present invention as viewed from the reader shield side.

Another problem is that a leakage magnetic field from a pole which absorbs a stray magnetic field in the magnetic disk apparatus might erase written data. When the volume of the magnetic body around the main pole which is a component of the magnetic head is larger, the magnetic body absorbs more magnetic flux and the resistance to the influence of stray magnetic field is higher. Hence, in order to prevent reduction in the volume of the magnetic body as a shield, only the height of the magnetic body part which crosses the main pole may be decreased as shown in FIG. 7. When only the height of the part which crosses the main pole is decreased, the field intensity applied at the read element is reduced without seriously deteriorating the resistance to the influence of stray magnetic field.

Figure 8:
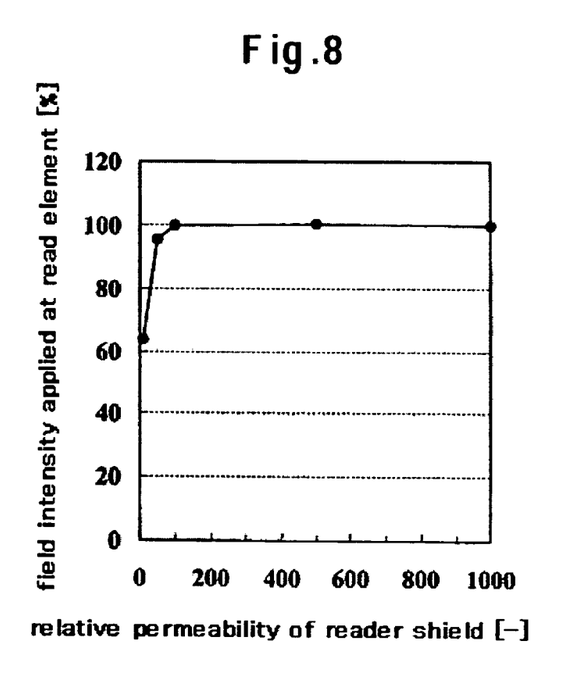
FIG. 8 shows the relation between the field intensity applied at the read element and the relative permeability of the reader shield.

The field intensity applied at the read element can be reduced not only by the use of short reader shields but also by the use of a shield material with a low relative permeability. FIG. 8 is a graph showing change in the field intensity applied at the read element with change in reader shield relative permeability in the conventional head in which the reader shield length is longer than the length up to the position of back contact as shown in FIG. 15. In the graph, the vertical axis represents percentages with respect to the field intensity with a reader shield relative permeability of 1000. As can be understood from the graph, when the relative permeability of the shield material is 100 or less, the field intensity applied at the read element begins to decline. When it is more than 100, the reader shields absorb a leakage magnetic flux, etc. from the head and a higher field intensity is applied at the read element. When it is 100 or less, the amount of leakage magnetic flux, etc. which the reader shields absorb decreases and the field intensity applied at the read element declines.

Figure 9:
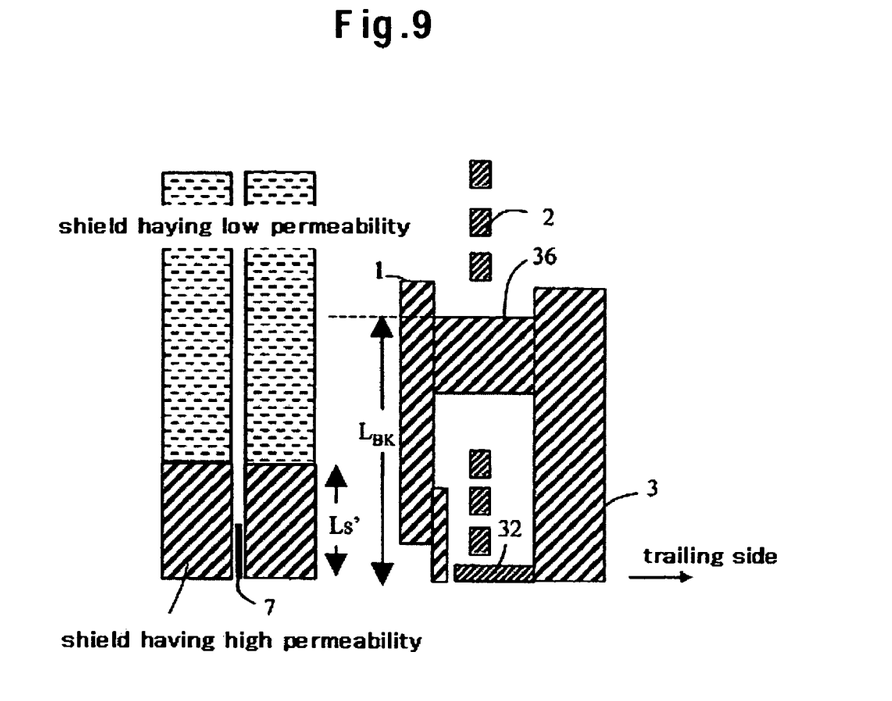
FIG. 9 shows the structure of a magnetic head according to another embodiment of the present invention.
Figure 10:
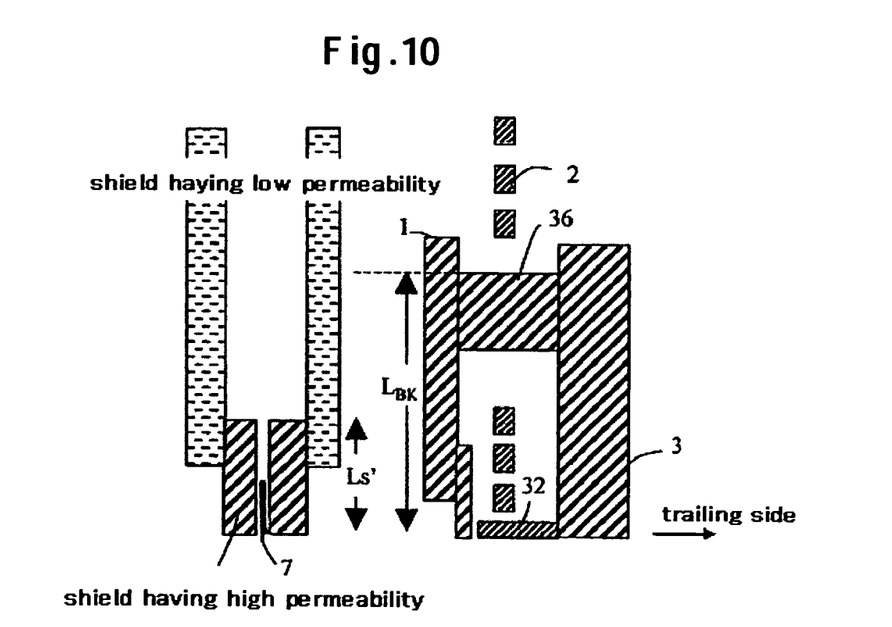
FIG. 10 shows the structure of a magnetic head according to another embodiment of the present invention.
Figure 11:
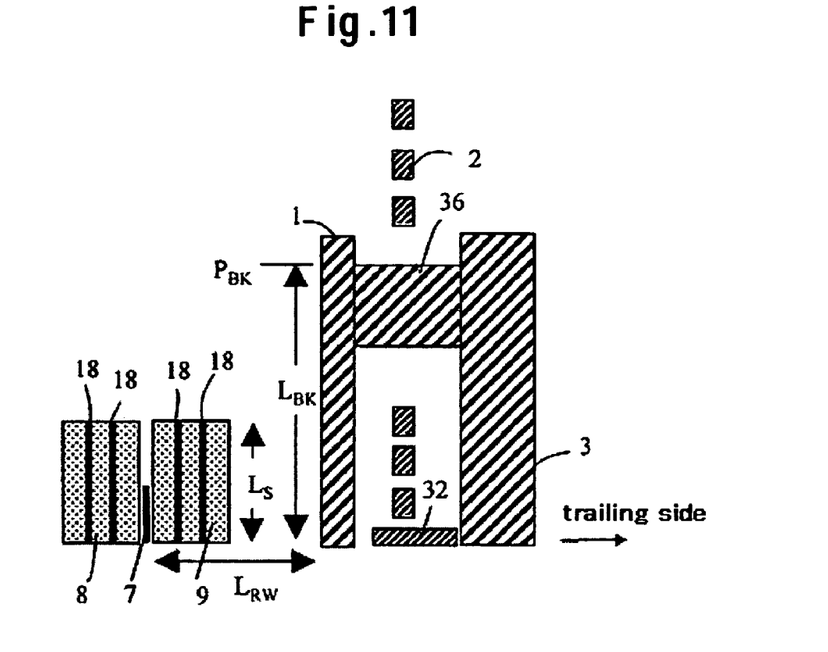
FIG. 11 shows the structure of a magnetic head according to another embodiment of the present invention.

However, when the relative permeability is too low, the reader shields' primary function that shields the read element from a leakage magnetic field by the medium deteriorates. Hence, it is more desirable that a reader shield part which is nearer to the air bearing surface has a higher relative permeability while a reader shield part which is farther from the air bearing surface has a lower relative permeability as shown in FIG. 9. Preferably the relative permeability of the part nearer to the air bearing surface should be 100 or so and that of the part farther from the air bearing surface should be 1000 or so. Here, the length of the shield part with the higher relative permeability, $L_S'$, should be smaller than $L_{BK}$. It is no problem that there is a gap between parts with different relative permeabilities. In this case, the head manufacturing process will be easier. When as shown in FIG. 10 the parts with different relative permeabilities are not flush with each other, the head manufacturing process will be easier. Another approach to lowering the relative permeability is that the reader shields 8 and 9 each include at least two magnetic layers with a non-magnetic layer 18 between them as shown in FIG. 11.

Figure 12:
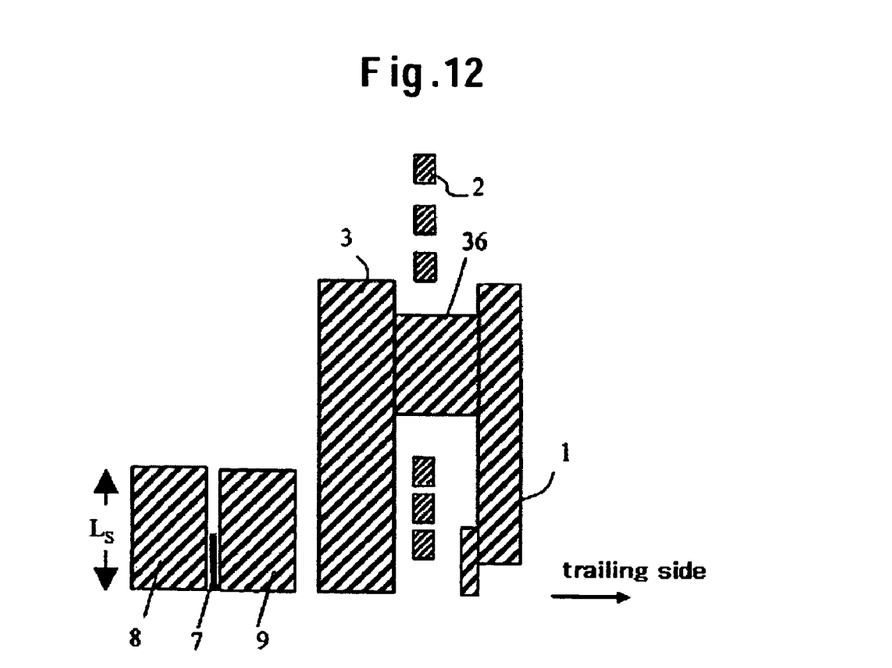
FIG. 12 shows the structure of a magnetic head according to another embodiment of the present invention.

Even when the concept of the present invention is applied to a structure in which the reader shields 8 and 9 are nearer to the auxiliary pole 3 than to the main pole 1 as shown in FIG. 12, the field intensity applied at the read element can be reduced. When the reader shields 8 and 9 are nearer to the auxiliary pole 3 than to the main pole 1, basically the field intensity applied at the read element is as low as $1.18 \times 10^4$ A/m; when the present invention is applied, it is reduced to a half or less. This prevents deterioration of the read element.

Figure 13:
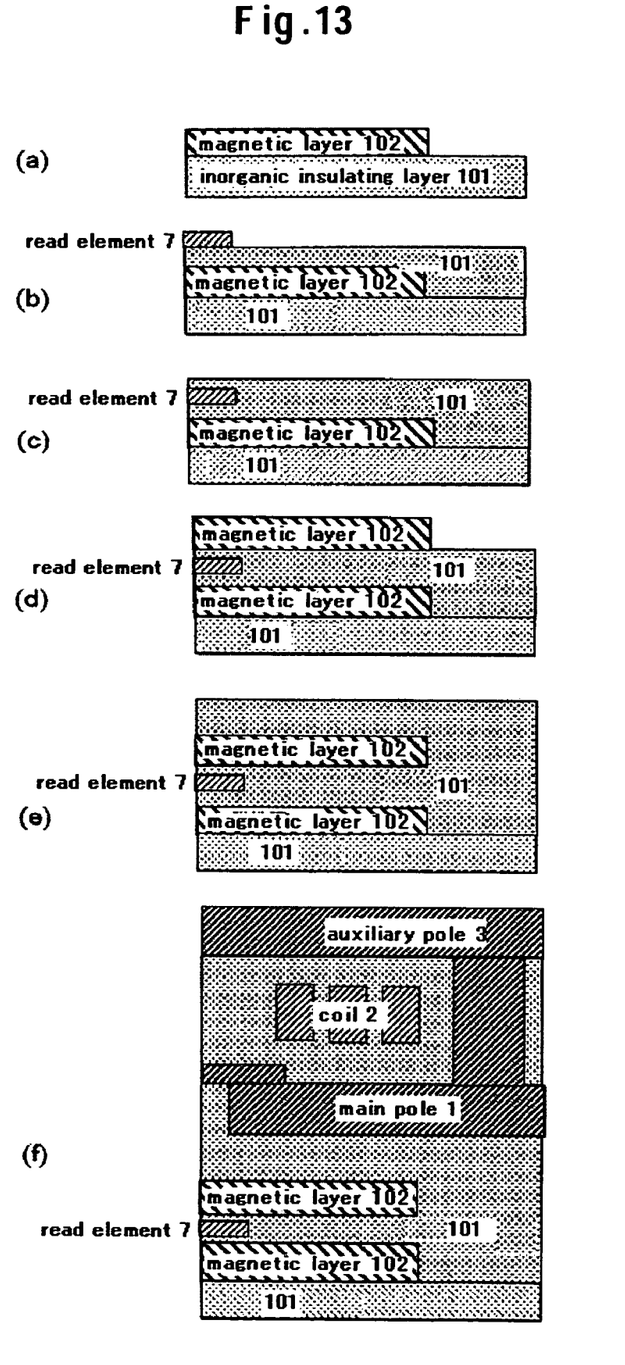
FIG. 13 shows the process of manufacturing a magnetic head according to an embodiment of the present invention.

FIG. 13 shows sectional views illustrating the steps of manufacturing a head according to an embodiment of the present invention. At step (a), an inorganic insulating layer 101 is formed on a substrate of alumina titanium carbide, glass or the like by sputtering. A magnetic layer 102 which is to constitute a lower shield is formed on the flat inorganic insulating layer 101 by flame coating. The length of the magnetic layer 102 should be shorter than the length up to the position of back contact which will be later determined. At step (b), an inorganic insulating layer 101' which is to constitute a lower gap is formed over it by sputtering and flattened by a chemical mechanical polish (CMP) process. Over the inorganic insulating later 101', a read element 7 and an electrode layer and a bias layer for electrifying it are formed. At step (c), an inorganic insulating layer 101" which is to constitute an upper gap layer is formed in a way to cover the read element 7, electrode layer and bias layer. At step (d), a magnetic layer 102' which is to constitute an upper shield is formed by flame coating. The length of the magnetic layer 102' should be shorter than the length up to the position of back contact which will be later determined. After this, at step (e), an inorganic insulating layer 101 is formed and at step (f), procedures of making a main pole, coils and an auxiliary pole sequentially are taken to obtain a head structure according to the present invention.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head comprising:
   a write head having a main pole and an auxiliary pole that are substantially the same height;
   a pillar element disposed away from an air bearing surface and magnetically
   connecting the main pole and auxiliary pole; and
   a read head having a pair of reader shields equal in height and a read element located between said pair of reader shields,
   wherein the length of said pair of reader shields from the air bearing surface in the direction of the element height is one-third the length of said main pole and said auxiliary pole from the air bearing surface to a position of back contact which is a position farthest from the air bearing surface in an area of connection of the main pole and the auxiliary pole,
   wherein the pillar element is not integral with the auxiliary pole or the main pole.

2. The magnetic head as claimed in claim 1, wherein said main pole is located nearer to said pair of reader shields than said auxiliary pole.

3. The magnetic head as claimed in claim 1, wherein the length of said reader shields from the air bearing surface in the direction of the element height is twice or more times the length of said read element from the air bearing surface.

4. A magnetic head comprising:
   a write head having a main pole and an auxiliary pole that are substantially the same height;
   a pillar element disposed away from an air bearing surface and magnetically connecting the main pole and auxiliary pole; and
   a read head having a pair of reader shields equal in height and a read element located between said pair of reader shields,
   wherein the length of said pair of reader shields from the air bearing surface in the direction of the element height is one-third the length of said main pole and said auxiliary pole,
   wherein the pillar element is not integral with the auxiliary pole or the main pole.

5. A magnetic head comprising:
   a write head having a main pole and an auxiliary pole that are substantially the same height;
   a pillar element disposed away from an air bearing surface and magnetically connecting the main pole and auxiliary pole; and
   a read head having a pair of reader shields that are equal in height and one-third the length of said main pole and said auxiliary pole, and a read element located between said pair of reader shields,
   wherein said main pole is located nearer to said pair of reader shields than said auxiliary pole; and
   wherein a relative permeability of said pair of reader shields is 100 or less,
   wherein the pillar element is not integral with the auxiliary pole or the main pole.

6. A magnetic disk storage apparatus comprising:
   a magnetic recording medium having a magnetic recording layer and a soft underlayer;
   a motor which drives said magnetic recording medium;
   a magnetic head which writes to, and reads from, said magnetic recording medium; and
   a magnetic head drive which drives said magnetic head with respect to said magnetic reading medium,
   said magnetic head comprising:
      a write head having a main pole and an auxiliary pole that are substantially the same height;
      a pillar element disposed away from an air bearing surface and magnetically connecting the main pole and auxiliary pole;
      a read head having a pair of reader shields equal in height and a read element located between said pair of reader shields,
      wherein the length of said pair of reader shields from the air bearing surface in the direction of the element height is one-third the length of said main pole and said auxiliary pole from the air bearing surface to a position of back contact which is a position farthest from the air bearing surface in an area of connection of the main pole and the auxiliary pole,
      wherein the pillar element is not integral with the auxiliary pole or the main pole.

7. The magnetic disk storage apparatus as claimed in claim 6, wherein said main pole is located nearer to said pair of reader shields than said auxiliary pole.

8. The magnetic disk storage apparatus as claimed in claim 6, wherein the length of said reader shields from the air bearing surface in the direction of the element height is twice or more times the length of said read element from the air bearing surface.

9. A magnetic disk storage apparatus comprising:
a magnetic recording medium having a magnetic recording layer and a soft underlayer;
a motor which drives said magnetic recording medium;
a magnetic head which writes to, and reads from, said magnetic recording medium; and
a magnetic head drive which drives said magnetic head with respect to said magnetic reading medium,
said magnetic head comprising:
- a write head having a main pole and an auxiliary pole that are substantially the same height;
- a pillar element that magnetically connects the main pole and the auxiliary pole, and
- a read head having a pair of reader shields that are equal in height and one-third the length of said main pole and said auxiliary pole, and a read element located between said pair of reader shields,
wherein said main pole is located nearer to said pair of reader shields than said auxiliary pole; and
wherein a relative permeability of said pair of reader shields is 100 or less,
wherein the pillar element is not integral with the auxiliary pole or the main pole.

* * * * *